(12) United States Patent
Duke

(10) Patent No.: US 8,419,432 B2
(45) Date of Patent: Apr. 16, 2013

(54) TACTILE SUDOKU GAME DISPLAY FOR THE BLIND

(76) Inventor: William Lewis Duke, Santa Clarita, CA (US)

( * ) Notice: Subject to any disclaimer, the term of this patent is extended or adjusted under 35 U.S.C. 154(b) by 658 days.

(21) Appl. No.: 12/455,868

(22) Filed: Jun. 8, 2009

(65) Prior Publication Data

US 2010/0311019 A1 Dec. 9, 2010

(51) Int. Cl.
*A63F 3/00* (2006.01)
(52) U.S. Cl.
USPC ......... 434/113; 273/153 R; 273/237; 273/287
(58) Field of Classification Search .............. 273/153 R, 273/454, 237; 434/113, 114, 128
See application file for complete search history.

(56) References Cited

U.S. PATENT DOCUMENTS

2007/0145681 A1* 6/2007 Terbush et al. ........... 273/148 R
2007/0176362 A1* 8/2007 Hohenstein et al. .......... 273/260

FOREIGN PATENT DOCUMENTS

FR 2922462 A1 * 4/2009
GB 2440121 A * 1/2008

* cited by examiner

*Primary Examiner* — Vishu K. Mendiratta

(57) ABSTRACT

The Tactile Sudoku Game Display for the Blind has 4 control buttons used by the blind game player to manually direct the attached computer to change the current game square up and down and left and right. The Game Display has 27 electro-mechanically raised and lowered dots similar to Braille dots arranged in 3 squares each with 9 dots arranged in 3 rows and 3 columns. The raised dots in the Game Display's lower-right square communicate the current status of 1 of the 81 Sudoku game squares to the blind game player by touch. And 1 raised dot in each of the Game Display's other 2 squares communicates the column number and row number of the current game square to the blind game player by touch. The game author's given starting game squares have only 1 of the 9 dots raised; and, the blind game player touches and depresses all but 1 of the 9 dots in each remaining game square to complete the game.

1 Claim, 1 Drawing Sheet

Game display approximately 1½ by 1½ inches with 27 raised dots and 4 control buttons

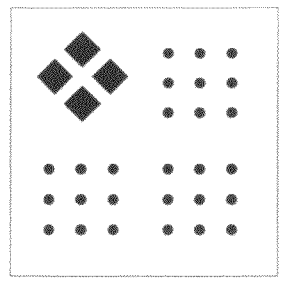
Game display approximately 1½ by 1½ inches with 27 raised dots and 4 control buttons

TACTILE SUDOKU GAME DISPLAY FOR THE BLIND

CROSS-REFERENCE TO RELATED APPLICATIONS

This application claims the benefit of Provisional Patent Application Ser. No. 60/794,350, filed 24 Apr. 2006 by the present inventor, patent application Ser. No. 11/729,063 filed 28 Mar. 2007 by the present inventor, and Amended patent application Ser. No. 11/729,063 filed 31 Jul. 2008 by the present inventor.

FEDERALLY SPONSORED RESEARCH

Not applicable.

SEQUENCE LISTING OR PROGRAM

Not applicable.

BACKGROUND OF THE INVENTION

1. Field of Invention

This invention generally relates to amusement devices called games which require strategy and problem solving by a human participant, specifically to a game page that provides blind or visually impaired persons with the ability to play the game Sudoku by touch rather than by sight.

2. Prior Art

This invention utilizes the game Sudoku played by millions of sighted persons using written alphanumeric symbols on printed paper pages or on computer displays. The most common version of the game Sudoku presents the player with a puzzle containing eighty-one squares arranged in nine rows and nine columns. The author of one of the millions of possible Sudoku puzzles inserts one of the numbers one to nine in a sufficient number of starting squares such that the game has a unique solution. The player then proceeds to fill in each of the empty squares with one of the digits one to nine such that the same number is not duplicated in any one of the nine rows, nine columns, or nine three-square-by-three-square boxes of the game page. Other similar versions of the game Sudoku contain more or fewer than eighty-one squares utilize a set of more or fewer than nine numeric, alphanumeric, or picture symbols; but, still place only one symbol in each square.

This invention utilizes the prior art of electromechanically raised and lowered Braille dots used in currently available refreshable Braille displays attached to or integrated with computers, Braille keyboards, and Braille note-taking equipment to communicate information between blind persons and computers.

This invention utilizes the prior art of electromechanical keyboards to communicate information from Blind persons to computers.

3. Objects and Advantages

Accordingly, the objects and advantages of this Tactile Sudoku Game Display for the Blind invention are to allow blind and visually impaired persons to play the game Sudoku and similar games by touch rather than by sight. The invention uses raised dots similar to Braille dots in each game square. The remaining raised dots in a game square represent the one or more still possible numeric, alphabetic, or other symbols for that game square and the depressed dots represent the symbols no longer possible for that game square. Further objects and advantages will become apparent from a consideration of the ensuing description and drawings.

SUMMARY OF THE INVENTION

The Tactile Sudoku Game Display for the Blind is a machine that provides humans with the ability to use their sense of touch to create and play Sudoku and similar problem solving puzzle games.

DRAWINGS—FIGURES

See FIG. 1 on page 1 of Drawings. FIG. 1 shows the approximately one-and-a-half-inch by one-and-a-half-inch top or front view of the Tactile Sudoku Game Display for the Blind with four black printed squares representing the four directional control buttons and twenty-seven black printed dots representing the computer controlled dots that the blind game player can read by touch and also manually depress to communicate with the computer.

DETAILED DESCRIPTION OF THE INVENTION

As illustrated in FIG. 1 the most common version of the Tactile Sudoku Game Display for the Blind has nine raised dots in each game square arranged in a square pattern of three rows of three dots and three columns of three dots. Each dot can be either raised or depressed. The game author's starting squares have only one of the nine dots raised indicating the given number for that square. The blind game player depresses all but one of the nine dots in each remaining square to select the answer for that square and completes the game when only one dot remains raised in each game square.

There are a number of variations of the Sudoku game which include more squares and numbers than the most common nine-square-by-nine-square game such as the sixteen-square-by-sixteen-square game, the twenty-five-square-by-twenty-five-square game, and even larger games for players with greater skill. And some variations include fewer squares such as the four-square-by-four-square game and the six-square-by six-square game for beginners and children. Some more difficult Sudoku games also require the player to place unique (non duplicate) numbers in additional locations such as the main diagonals of the game page and some that require arithmetic relationships between numbers placed in adjacent squares.

The Tactile Sudoku Game Display for the Blind invented by the inventor and described in this document is applicable to and can be used with any of the above described variations of the Sudoku game by increasing or decreasing the number of dots contained in each game square. However, the detailed description of the Tactile Sudoku Game Page for the Blind contained in this patent application will, for ease of understanding, only describe in detail the most popular variation of the Sudoku game, which is the nine-square-by-nine-square, eighty-one-square game that uses the digits one through nine represented by the nine raised dots.

The game display is constructed with electromechanical dot raising and dot lowering technology similar to that used in currently available refreshable Braille displays that are attached to computers, keyboards, and note-takers.

The game display may be designed with as few as twenty-seven computer-controlled dots as illustrated in FIG. 1. This game display would have nine dots in the single active lower-right square being read or depressed by the blind game player, nine dots placed to the left of the active square identifying the row number of the active square, and nine dots placed above the active square identifying the column number of the active square. In addition this display would include four directional control buttons for manually directing the computer to move the active square being read or changed by the blind game player to the next available square above, below, left, or right of the current active square.

For the Tactile Sudoku Game Display for the Blind, the game author can prepare Sudoku puzzles for the blind game player with a single raised dot representing the given starting number provided by the game author for that square. And the game author can provide the blind game player with the following two options for initializing the remaining blank squares left for the blind game player to complete—either all nine dots are raised or just the dots for the remaining possible numbers are raised. The blind game player then proceeds to play the game by depressing the dots representing the already used and incorrect numbers in each square until a single dot remains raised in that square representing the correct solution number for that square. The tactile Sudoku game is complete when the blind game player has only a single raised dot remaining in each of the eighty-one squares displayed on the Tactile Sudoku Game Display for the Blind.

The invention claimed is:

1. A method of playing a Sudoku game comprising the steps of:

(a) providing a control display having 27 dots arranged in three squares of 9 each dots in 3 rows and 3 columns configured to be electronically raised and lowered;

(b) the game display further having 4 control buttons on upper left location on the display and configured for the game player to manually change a current square up, down, left and right direction;

(c) the first 9 dots in 3 by 3 positioned upper right, the second 9 dots in 3 by 3 positioned in lower left and the third 9 dots in 3 by 3 positioned in lower right locations of the control display;

(d) providing a Sudoku game display having 81 squares in 9 by 9 rows and columns, each square having 9 dots in 3 by 3 rows and columns;

(e) the method further comprising the control display displaying 1 raised dot in each of upper right 9 dot square and lower left 9 dot square to indicate the current column and row number respectively of the lower-right 9 dot square;

(f) the lower-right 9 dot square displaying the current status of 1 of the 81 Sudoku game squares, each square having 9 dots 3 by 3, wherein each 1 of 81 game squares has all but 1 dot depressed in each of the starting squares as originally presented in the Sudoku game;

(g) the player depressing all but one dots in all remaining squares to complete the Sudoku game.

* * * * *